Patented July 29, 1952

2,605,243

UNITED STATES PATENT OFFICE 2,605,243

MODIFIED ALKYD RESINS FROM AN ALKYD RESIN AND AN ALKOXY HYDROCARBON SILANE

Frank J. Sowa, Cranford, N. J.

No Drawing. Application May 26, 1947,
Serial No. 750,640

12 Claims. (Cl. 260—22)

This invention relates to improved alkyd resins, to a method for the preparation thereof, and to coating compositions containing the same.

Alkyd resins are widely used in coating compositions, and in general produce a tough, durable film having a satisfactory lustre. However, alkyd resin coating compositions exhibit low resistance to the actions of water and alkalies. Furthermore, coating compositions containing alkyd resins which are modified with non-drying oils generally do not harden sufficiently even on prolonged baking at high temperatures.

It is therefore an object of this invention to provide an alkyd resin which when used in a coating composition dries to yield a film of increased resistance to alkalies and water.

It is also an object of this invention to produce alkyd resins which when incorporated into coating compositions dry at an increased rate to produce a film of increased hardness and flexibility.

It is a further object of this invention to prepare alkyd resins which when incorporated into coating compositions have satisfactory color stability when baked.

The aforementioned and other objects are accomplished in accordance with this invention by incorporating into an alkyd resin an organosilicon compound having the generic formula $R_ySiX_{4-y}$, in which R is an alkyl, alkenyl or aryl radical, X is an alkoxy radical, and $y$ is one, two or three.

For a more complete understanding of the present invention, reference is made to the following examples which illustrate specific embodiments thereof.

Example I

An alkyd resin was prepared by reacting 39 parts of soy bean fatty acids, 40.3 parts of phthalic anhydride and 28.3 parts of glycerol, the reaction being effected by heating the foregoing materials under a carbon dioxide blanket to a temperature of 420° F. until an acid number of 5–10 was obtained. The viscosity of the finished alkyd resin was in the range of $Z_3$–$Z_5$ (Gardner-Holdt viscosimeter) when dissolved in xylol to form a solution having a 60% solids content.

Monoamyl triethoxysilane was mixed with the 60% solids solution of the alkyd resin in xylol in 1:1 and 1:3 proportion on the solids basis. The two mixtures and the unmodified alkyd resin by itself were reduced to a 50% solids solution in xylol, were applied to a panel, and were then baked at 300° F. for two hours. The following table indicates the Sward Rocker hardnesses and the resistances of the baked films to 2% aqueous caustic soda.

|  | Soybean Alkyd | 50% Soy Alkyd 50% monoamyl triethoxysilane | 75% Soy Alkyd 25% monoamyl triethoxysilane |
|---|---|---|---|
| Sward Rocker Hardness After Baking at 300° F.: |  |  |  |
| for 1 hour | 15 | 24 | 26 |
| for 2 hours | 23 | 28 | 26 |
| Resistance of baked film to 2% Caustic | (*) | †S ‡3 | †S ‡3 |

\* Complete breakdown after 15 minutes.
† S—Indicates softening.
‡ —This number indicates time in hours of immersion in the caustic.

Example II

An alkyd resin was prepared by reacting 29.7 parts of coconut fatty acids, 47.5 parts of phthalic anhydride and 31.8 parts of glycerol, the reaction being effected by heating the ingredients under an inert atmosphere to 380° F. and holding them at that temperature until the acid number of the mixture had dropped to 4–8. The viscosity of the finished resin was about P-U (Gardner-Holdt viscosimeter) at 50% solids in xylol.

18.2 gms. of monoallyl triethoxysilane was placed in a flask with 200 gms. of a 50% solution of the alkyd resin in xylol. The flask was fitted with a stirrer, a small fractionating column, a reflux head and a condenser, and the mixture was heated therein until the temperature of the mixture reached 85° C. The temperature at the top of the reflux column was 78° C., and ethyl alcohol was removed by distillation until about 4.1 gms. thereof was collected. This amount of ethyl alcohol corresponded to the reaction of one ethoxy group on the monoallyl triethoxysilane with the hydroxy groups of the alkyd resin. The solution remaining in the flask had a Gardner-Holdt viscosity of about T at a solids content of about 57% in xylol. A 0.005 in. film was applied to a steel panel, and baked at 392° F. for ½ hour. The film cured rapidly to a very hard and flexible coating having excellent adhesion to the panel.

A pigmented film was prepared from a paint containing 45% of titanium dioxide, 24.7% of the modified alkyd resin, and 30.3% of xylol. The film was baked at 400° F. for ½ hour to yield a coating having a Sward Rocker hardness of 15. After a one hour test with 3% aqueous sodium hydroxide solution, the film laid down by the modified alkyd resin was only slightly attacked, whereas a comparable film laid down by the modified alkyd resin was completely destroyed when subjected to the same test.

*Example III*

200 gms. of a 50% solution in xylol of the alkyd resin prepared as described under the first paragraph of Example II and 27.3 gms. of diisopropyl diethoxysilane were refluxed at 140° C. for one hour. 8 gms. of ethyl alcohol was distilled off, and the viscosity of the solution remaining in the flask was Y (Gardner-Holdt viscosimeter). When the solution was applied to a panel, the film resulting therefrom had a Sward Rocker hardness of 15 after baking for one hour at 177° C. The film softened in 3% aqueous caustic soda after 1½ hours, whereas a corresponding film of the unmodified alkyd suffered a complete break-down in 10 minutes.

The foregoing examples illustrate the method of the present invention for the preparation of improved alkyd resins by reacting them with certain organosilicon compounds. The reaction between the alkyd resin and the silane may be effected over a wide range of temperatures, e. g., by refluxing them at low temperatures when dissolved in an inert organic solvent, or by baking the alkyd resin and the silane in contact with each other at temperatures below the boiling point of the organosilane used for about 30 minutes and then at temperatures which are customarily employed in the art of baking alkyd resins which have not been so modified. A wide range of relative proportions of silane to alkyd resin may be employed. Thus, the ratio of the number of molecules of the silane to the sum of the numbers of the hydroxy and carboxy groups of the alkyd resin should be from about 0.05 to about 1.0.

The beneficial effects of the present invention may be obtained by reacting one of the specified silanes, or mixtures thereof, with any of the wide variety of alkyd resins known in the art. Hence, in place of the particular alkyd resins which were modified in the examples, there may be similarly modified alkyd resins prepared in known manner by the reaction of polycarboxylic acids (e. g., phthalic acid, phthalic anhydride, maleic acid, maleic anhydride, fumaric acid, oxalic acid, succinic acid, glutaric acid, adipic acid, pimelic acid, sebacic acid, isophthalic acid, terephthalic acid, etc.) with polyhydroxy alcohols (e. g., glycerol, pentaerythritol, trimethylene glycol, propylene glycol, diethylene glycol, erythritol, mannitol, sorbitol, etc.). In the examples, the alkyd resins described were modified with monocarboxylic acids derived from fatty oils, but the advantages of the present invention may be realized regardless of whether or not the alkyd resin modified with the silane contains as modifiers fatty acids derived from fatty oils. However, when monocarboxylic acid modifiers are used in preparing the alkyd resin to be reacted with the silane, such modifiers may be the fatty glycerides commonly employed in the art in the manufacture of alkyd resins (e. g., linseed oil, tung oil, cottonseed oil, soybean oil, oiticica oil, etc.) or the monocarboxylic acids derived therefrom or rosin.

The improved alkyd resins of the present invention may be prepared using a wide variety of silanes. Thus, in place of the amyl triethoxysilane, allyl triethoxysilane, diisopropyl diethoxysilane, employed in the examples, there may be substituted any silane having the generic formula $R_y SiX_{4-y}$, in which R is an alkyl, alkenyl or aryl radical, X is an alkoxy radical, and $y$ is one, two or three. Thus, R may be the methyl, ethyl, n-propyl, i-propyl, n-butyl, n-amyl, i-propenyl, allyl, 2-butenyl, isobutenyl, methallyl, phenyl, benzyl, phenylethyl, o-methylphenyl, m-methylphenyl, p-methylphenyl, 3,5-dimethyl phenyl, etc. radical. Furthermore, the silane may be of the mixed variety, and mixtures of silanes having the aforementioned generic formula may also be employed as modifiers. The alkoxy radical X may suitably be the methoxy, n-propoxy, i-propoxy, n-butoxy, etc. radical as well as the ethoxy radical shown in the examples.

As the examples illustrate, the present invention also comprehends coating compositions containing the silane-modified alkyd resins prepared as hereinbefore described, such coating composition being solutions of the silane-modified alkyd resins in any wide variety of solvents which are customarily employed in the art for coating compositions, such as benzene, toluene, the xylenes, mineral spirits, turpentine, etc. In addition, such coating compositions may contain pigments, such as titanium dioxide, lithopone, zinc oxide, etc., and/or driers such as cobalt and manganese naphthenates and oleates.

This application is a continuation-in-part of my copending application, Serial No. 461,892, filed October 13, 1942, entitled "Artificial Structures and Compositions for Producing the Same," and now abandoned.

I claim:

1. A modified alkyl resin produced by reacting an alkyl resin with a compound of the generic formula $R_y SiX_{4-y}$, in which R is a substituent selected from the group consisting of alkenyl radicals having from three to four carbon atoms, alkyl and aryl radicals, X is an alkoxy radical having from one to five carbon atoms, and $y$ is an integer from one to three, at a temperature sufficient to remove alcohol formed by the reaction.

2. The product defined by claim 1 in which the alkyd resin is a glycerol-phthallic anhydride resin.

3. The product defined by claim 2 in which the glycerol-phthallic anhydride resin is modified with a drying oil.

4. The product as defined by claim 1 in which $y$ is 1.

5. The product defined by claim 1 in which $y$ is 2.

6. The product defined by claim 1 in which $y$ is 3.

7. Method of preparing modified alkyd resins which comprises reacting an alkyd resin with a compound of the generic formula $R_y SiX_{4-y}$ in which R is a substituent selected from the group consisting of alkenyl radicals having from three to four carbon atoms, alkyl and aryl radicals, X is an alkoxy radical having from one to five carbon atoms, and $y$ is an integer from one to three, at a temperature at which alcohol formed by the reaction is driven off.

8. The method of claim 7 in which the alkyd resin is a glycerol-phthallic anhydride resin.

9. The method of claim 8 in which the glycerol-phthallic anhydride resin is modified with a drying oil.

10. The method of claim 7 in which $y$ is 1.

11. The method of claim 7 in which $y$ is 2.

12. The method of claim 7 in which $y$ is 3.

FRANK J. SOWA.

(References on following page)

REFERENCES CITED

The following references are of record in the file of this patent:

UNITED STATES PATENTS

| Number | Name | Date |
| --- | --- | --- |
| 2,258,218 | Rochow | Oct. 7, 1941 |
| 2,258,220 | Rochow | Oct. 7, 1941 |
| 2,258,222 | Rochow | Oct. 7, 1941 |
| 2,386,793 | Hanford | Oct. 16, 1945 |
| 2,389,491 | Dunlop et al. | Nov. 20, 1945 |
| 2,395,550 | Iler | Feb. 26, 1946 |
| 2,409,633 | Kropa | Oct. 22, 1946 |
| 2,413,582 | Rust et al. | Dec. 31, 1946 |
| 2,426,121 | Rust | Aug. 19, 1947 |
| 2,443,740 | Kropa | June 22, 1948 |
| 2,500,842 | MacKenzie et al. | Mar. 14, 1950 |
| 2,500,843 | MacKenzie et al. | Mar. 14, 1950 |

FOREIGN PATENTS

| Number | Country | Date |
| --- | --- | --- |
| 583,754 | Great Britain | Dec. 30, 1946 |

OTHER REFERENCES

Rochow, Chemistry of the Silicones, Wiley 1946, pages 34 to 36.

Simmonds and Ellis, Handbook of Plastics, D. Van Nostrand Co., 1943, page 963.

General Electric Co., Glyptal Alkyd Resins, CD C-194, 2-51, a folder with two pages, received April 30, 1951.

Morrell, Synthetic Resins and Allied Plastics, London, 1937, pp. 13 to 15 and 212.

Wakeman, The Chemistry of Commercial Plastics, Reinhold, 1947, pp. 216 and 217.